(12) United States Patent
Hinderthür

(10) Patent No.: US 7,778,544 B2
(45) Date of Patent: Aug. 17, 2010

(54) METHOD AND DEVICE FOR MONITORING AN OPTICAL TRANSMISSION LINE, ESPECIALLY AN OPTICAL TRANSMISSION LINE TO AN END SUBSCRIBER OF A TRANSMISSION NETWORK

(75) Inventor: Henning Hinderthür, München (DE)

(73) Assignee: ADVA AG Optical Networking, Meiningen (DE)

( * ) Notice: Subject to any disclaimer, the term of this patent is extended or adjusted under 35 U.S.C. 154(b) by 757 days.

(21) Appl. No.: 11/412,201

(22) Filed: Apr. 26, 2006

(65) Prior Publication Data

US 2007/0154213 A1    Jul. 5, 2007

(30) Foreign Application Priority Data

Dec. 30, 2005    (DE) .................. 10 2005 063 102

(51) Int. Cl.
*H04B 10/08*    (2006.01)
(52) U.S. Cl. .............................. 398/25; 398/33; 398/38
(58) Field of Classification Search .................. 398/10, 398/17, 25, 32, 33, 38
See application file for complete search history.

(56) References Cited

U.S. PATENT DOCUMENTS

| | | | | |
|---|---|---|---|---|
| 5,943,124 | A * | 8/1999 | Haigh | 356/73.1 |
| 6,185,020 | B1 * | 2/2001 | Horiuchi et al. | 398/31 |
| 6,301,404 | B1 * | 10/2001 | Yoneyama | 385/24 |
| RE39,378 | E * | 11/2006 | Dugan et al. | 398/95 |
| 2002/0012137 | A1 | 1/2002 | Jager et al. | |
| 2002/0196444 | A1 * | 12/2002 | Nymen et al. | 356/460 |
| 2003/0007215 | A1 * | 1/2003 | Snawerdt | 359/152 |
| 2003/0081280 | A1 * | 5/2003 | Parsons | 359/110 |

FOREIGN PATENT DOCUMENTS

DE    692 27 613 T2    8/1992

(Continued)

OTHER PUBLICATIONS

Communication from German Patent and Trademark Office dated Jul. 20, 2006 (German Application No. 10 2005 063 102.9-35)(12 Pages).

*Primary Examiner*—Dzung D Tran
(74) *Attorney, Agent, or Firm*—The Culberston Group, P.C.

(57) ABSTRACT

A method for monitoring an optical transmission line in which digital optical signals are transmitted bidirectionally between a first and a second end point of the transmission line. At the first end point of the transmission line the digital optical signal to be transmitted to the second end point is amplitude-modulated with a preset frequency, with the modulation amplitude being small relative to the amplitude of the digital signal. At the second end point of the transmission line a small fraction of the power of the received digital signal is overcoupled passively on the optical transmission line in the direction towards the first end point and is transmitted to the first end point together with the digital signal to be transmitted from the second end point to the first end point of the optical transmission line. At the first end point the amplitude-modulated component of the received digital signal is detected. An interruption in the optical transmission line is determined when the power of the amplitude-modulated component or an associated optical or electrical characteristic parameter is smaller than a preset limit value.

13 Claims, 1 Drawing Sheet

FOREIGN PATENT DOCUMENTS

| | | |
|---|---|---|
| DE | 44 27 973 A1 | 2/1995 |
| EP | 0531047 A2 | 3/1993 |
| EP | 0782 279 A2 | 7/1997 |
| GB | 2 268 017 A | 12/1993 |
| GB | 2 280 326 A | 1/1995 |

* cited by examiner

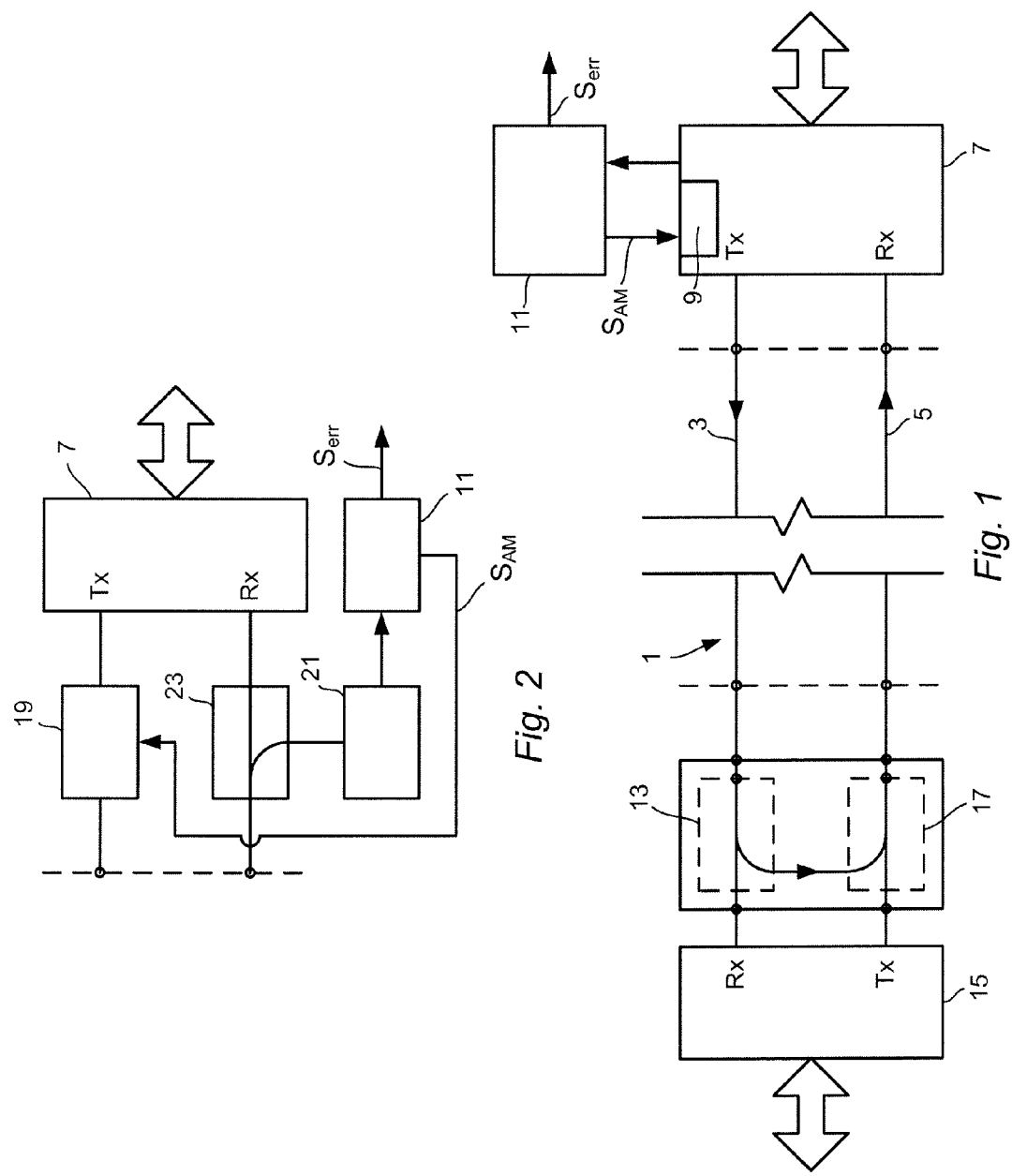

ME THOD AND DEVICE FOR MONITORING AN OPTICAL TRANSMISSION LINE, ESPECIALLY AN OPTICAL TRANSMISSION LINE TO AN END SUBSCRIBER OF A TRANSMISSION NETWORK

TECHNICAL FIELD OF THE INVENTION

The invention relates to a method and to a device for monitoring an optical transmission line, especially an optical transmission line to an end subscriber of a transmission network.

BACKGROUND OF THE INVENTION

For monitoring the operational readiness of optical networks, especially for the transmission of optical wavelength multiplexed signals, it is known to use an optical monitoring channel. For example, a unique wavelength can be used for this purpose in a DWDM signal. In this way, the information necessary for the complete management of the network can be transmitted between the different network nodes. Among other things, this monitoring channel can also be used to determine whether the optical transmission line between two network nodes is intact or broken. For this purpose, a network node is tested to determine whether an optical signal of the monitoring channel has been received or not. For example, here a signal can be transmitted to the relevant adjacent network node on the monitoring channel, optoelectrically converted and received in this node, and as a response, a corresponding signal can be transmitted back to the querying node on the monitoring channel. If the querying network node does not receive a reply signal within a predetermined time, then it concludes that there is a break in the transmission line.

Thus, on the subscriber side, the monitoring of a transmission line between a network node and an end subscriber requires an active device that can transmit a reply signal to a network node as a response to a querying signal.

Here, however, the expense for an active device, which is normally provided at the end point of the transmission line by the provider, who is responsible for the transmission line, is on the subscriber side and optionally must be paid for by the end subscriber.

From DE 100 19 814 A1, a method for monitoring the operation of optical supply fibers is known, in which an optical signal, in addition to the usable signal, i.e., an additional wavelength (or an additional wavelength range), is transmitted outside the spectrum of the usable signal from a central optical device to a decentralized optical device, separated from the usable signal in the decentralized device by means of a passive optical coupler, and transmitted back in the direction towards the central device. The central optical device detects the additional signal and recognizes a break in the transmission line if this signal is no longer present.

This method enables the monitoring of the line from a remote node, with only passive optical couplers being required in the decentralized device. However, a disadvantage is the expense for an additional optical transmitter element, as well as for the wavelength-selective passive coupler, as well as the fact that a certain wavelength range must be reserved for the additional monitoring signal, and therefore this range is not available for the transmission of usable signals.

SUMMARY OF THE INVENTION

The present invention addresses the problem of devising a method and a device for monitoring an optical transmission line, especially an optical transmission line to an end subscriber of a transmission network, with the ability to eliminate an active device for transmitting a signal to an adjacent network node for the purpose of monitoring the transmission line in a remote network node or on a subscriber-side end of a transmission network and with the entire bandwidth being available for transmitting usable signals.

The invention starts from the knowledge that additional information can be impressed on a digital optical signal, which is to be transmitted via a transmission line, through amplitude modulation of this signal. This information can be used according to the invention in order to test for a break in the transmission line, in that the additionally amplitude-modulated digital usable signal is to be fed with a low power percentage from a remote end of the transmission line back in the direction towards the other end, and here the presence of the information impressed by means of the amplitude modulation is to be detected. The amplitude modulation, i.e., the modulation amplitude, is here selected to be small relative to the amplitude of the digital signal and the modulation frequency is outside the frequency spectrum of interest for the amplitude-modulated digital signal, so that a disadvantageous effect on the usable signal is prevented. A break in the optical transmission line is then determined if the power of the amplitude-modulated component or an associated optical or electrical characteristic parameter is less than a preset limit value. Through the passive return of a small portion of the power of the optical signal arriving at the remote end of the transmission line in the direction towards the other end, an active device for monitoring the transmission line can be eliminated at the remote end. By modulating the usable signal, a separate wavelength range for the transmission of the monitoring signal is unnecessary.

According to one embodiment of the invention, the electrical signal on the side of the first end point of the transmission line (i.e., at the end point of the transmission line, at which the monitoring device is provided) corresponding to the digital optical signal to be transmitted is amplitude-modulated and the modulated electrical signal is subjected to electro-optical conversion. In this way, the method according to the invention can be integrated, e.g., economically into a conventional channel card.

According to another embodiment, the digital optical signal to be transmitted on the side of the first end point of the transmission line can be optically amplitude-modulated. Such a solution can be offered, for example, when the monitoring method according to the invention is to be retrofitted in an existing transmission device. For this purpose, only a controllable, variable optical attenuation unit must be used in the optical waveguide line at the output of the existing device.

If the optical transmission line has two optical waveguides, with a first optical waveguide being used for the transmission of the digital signal from the first to the second end point and a second optical waveguide being used for the transmission from the second end point to the first end point, then a small fraction of the power of the optical signal can be decoupled from the first optical waveguide at the second end point of the transmission line (i.e., at the end of the transmission line facing away from the monitoring device) by means of an optical coupling element and can be coupled into the second optical waveguide by means of a second optical coupling element.

If the optical transmission line is formed by a bidirectional optical waveguide, then a small fraction of the power of the optical signal can be reflected from the first optical waveguide in the direction towards the first end point at the second end point of the transmission line by means of an optical reflector element.

In both cases, a simple passive unit is sufficient for realizing the monitoring at this end.

According to the preferred embodiment of the method, the amplitude-modulated component contained in the digital signal received at the first end point is detected in a phase-sensitive way. This enables the amplitude modulation to be performed with a small modulation amplitude, so that this information lies in the vicinity of the upper noise limit and thus the digital signal cannot be affected disadvantageously in any way. The received digital signal returned in the direction towards the first end or a signal derived from this received signal can be rectified, in this case preferably in a phase-sensitive way, preferably by means of a lock-in amplifier.

For detecting the amplitude-modulated component at the second end point of the transmission line, the received, optoelectrically converted signal can be used, which is fed for this purpose to the detector unit. However, at the second end point, a portion of the optical power of the received optical signal can also be decoupled, optoelectrically converted separately, and used for detecting the amplitude-modulated component. The latter variant is suitable, e.g., for retrofitting a corresponding monitoring functionality.

These and other advantages and features of the invention will be apparent from the following description of the preferred embodiments, considered along with the accompanying drawings.

BRIEF DESCRIPTION OF THE DRAWINGS

FIG. 1 is a schematic block diagram of a transmission line with transmitter and receiver devices at both end points of the transmission line, as well as a device for realizing the monitoring device according to one form of the invention.

FIG. 2 is a schematic block diagram of another embodiment of a device according to the invention for monitoring a transmission line, which, among other things, is also suitable for retrofitting an existing transmitter and receiver device.

DESCRIPTION OF PREFERRED EMBODIMENTS

FIG. 1 shows a transmission line 1, which comprises two optical waveguides 3, 5, with the optical waveguide 3 being used for the transmission of a digital optical signal from a first end point of the transmission line to a second end point and the optical waveguide 5 being used for the transmission of a digital optical signal from the second end point of the transmission line to the first end point.

At the first end of the transmission line 1 there is a transmitter and receiver device 7, which has an optical transmitter port Tx and an optical receiver port Rx. The transmitter and receiver device 7 comprises an amplitude modulation unit 9, which is used for amplitude modulation of the electrical digital signal, which is to be transmitted as an optical signal via the transmission line 1 over the optical waveguide 3. The amplitude modulation is realized with a very minimal modulation amplitude, for example, on the order of 1%-2% (of the amplitude of the digital signal). The amplitude-modulated signal is then electro-optically converted and fed to the optical waveguide 3. The modulation signal $S_{AM}$ is fed to the amplitude modulation unit by a detector unit 11, which also comprises a corresponding oscillator (not shown).

The signal transmitted via the optical waveguide 3 is fed with a significant part of the signal power to a transmitter and receiver unit 15 at the other end of the transmission line 1 by means of a coupling element 13. The transmitter and receiver unit 15 can be constructed in a known way.

A small percentage of the optical power of the optical signal power received at the second end of the transmission line 1 is fed to another coupling element 17 by means of the coupling element 13 and returned in the direction towards the first end of the transmission line by means of coupling element 17. Here, this optical signal is superimposed with an optional optical usable signal, which is fed via the output port Tx of the transmitter and receiver device 15 and the coupling element 17 to the optical waveguide 5. The signal overcoupled on the optical waveguide 5 at the second end of the transmission line from the optical waveguide 3 is selected in its power so that it does not negatively affect the usable signal in terms of error-free reception at the first end of the transmission line.

At the first end of the transmission line, the received optical total signal is optoelectrically converted and further processed conventionally. In addition, the optoelectrically converted signal is fed to the detector unit 11, which preferably includes a phase-sensitive rectifier (lock-in amplifier). Thus, it is possible to filter a signal component overcoupled from the optical waveguide 3 to the optical waveguide 5 out of the total signal, even if this component lies in the vicinity of the upper noise limit in terms of its power.

The detector unit 11 compares the level of the amplitude-modulated signal component with a preset threshold and generates an error signal $S_{err}$ if the received level is below the threshold.

Obviously, the modulation frequency for the amplitude modulation is preferably selected so that this frequency lies outside of the frequency spectrum of interest for the digital usable signal to be transmitted, preferably clearly below this frequency spectrum in a range in which a meaningful phase-sensitive rectification can be performed; for example, in the range of a few 100 Hz.

FIG. 2 shows another alternative for a device for monitoring the transmission line 1.

The transmitter and receiver unit 7 shown in FIG. 2 involves a known receiver unit. This unit can be expanded by the monitoring function in connection with the detector unit 11, an optical modulation unit 19, and a separate unit 21 for optoelectrical conversion of a portion of the total signal transmitted on the optical waveguide 5, with this portion being fed to the separate unit by a coupling element 23. The coupling element 23, as well as also the coupling elements 13 and 17, can be constructed as an asymmetrical optical 1×2 coupler.

The optical modulator can be constructed as a variable optical attenuator (VOA), which is connected in an optical waveguide line between the output port Tx of the transmitter and receiver unit 7 and the first end of the transmission line. The electrical control signal $S_{AM}$ is fed to the VOA by the detector unit 11.

The total signal received at the first end of the transmission line 1 is split by means of the coupling element 23. The largest portion of the optical power is fed to the receiver port Rx of the transmitter and receiver unit 7 and processed conventionally. The smaller portion in terms of power is fed to the separate unit 21 for optoelectrical conversion, optoelectrically converted, and fed to the input of the detector unit 11.

At the second end of the transmission line 1, the combination of the coupling elements 13 and 17 shown in FIG. 1 can be reused. These coupling elements can be combined into a return unit, with the return unit being able to be constructed as a plug unit.

Obviously, the transmission line 1 can also be formed by a bidirectional optical waveguide. In this case, the coupling elements 13, 17 can be replaced by a reflector element, which reflects a small percentage of the optical power of the optical signal transmitted from the first to the second end of the transmission line 1, so that this portion is transmitted back in the direction towards the first end, optionally together with an optical usable signal.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for monitoring an optical transmission line in which digital optical signals are transmitted bidirectionally between a first end point of the transmission line and a second end point of the transmission line, the method including:
   (a) optically modulating the amplitude of a first digital optical signal to produce an amplitude-modulated digital optical signal at the first end point, and transmitting the amplitude-modulated digital optical signal over the transmission line in the direction from the first end point to the second end point, the amplitude-modulated digital optical signal carrying both the amplitude modulation provided by optically modulating the amplitude of the first digital optical signal and digital information of the first digital optical signal;
   (b) at the second end point, passively directing a fraction of the power of the amplitude-modulated digital optical signal onto the optical transmission line as an amplitude-modulated signal component propagating in the direction from the second end point towards the first end point, and transmitting the amplitude-modulated signal component to the first end point together with a second digital optical signal being transmitted from the second end point to the first end point;
   (c) detecting the amplitude-modulated signal component at the first end point in a phase-sensitive way; and
   (d) comparing a characteristic parameter associated with the amplitude-modulated signal component with a limit value for that parameter, the characteristic parameter associated with the amplitude-modulated signal component comprising the power level of the amplitude-modulated signal component or an optical or electrical characteristic derived from the amplitude-modulated signal component, wherein the comparison indicates an interruption of the optical transmission line when the characteristic parameter associated with the amplitude-modulated signal component is less than the limit value for that parameter.

2. The method of claim 1 wherein the optical transmission line includes a first optical waveguide and a second optical waveguide, the first optical waveguide being used for transmitting the first digital optical signal from the first end point to the second end point and the second optical waveguide being used for transmitting the second digital optical signal from the second end point to the first end point, and wherein passively directing the fraction of the power of the amplitude-modulated digital optical signal onto the optical transmission line as the amplitude-modulated signal component propagating in the direction from the second end point towards the first end point comprises decoupling the fraction of the power of the amplitude-modulated digital optical signal from the first optical waveguide and coupling the decoupled signal into the second optical waveguide.

3. The method of claim 1 wherein the optical transmission line comprises a bidirectional optical waveguide and wherein passively directing the fraction of the power of the amplitude-modulated digital optical signal onto the optical transmission line as the amplitude-modulated signal component propagating in the direction from the second end point towards the first end point comprises reflecting a portion of the amplitude-modulated digital optical signal in the bidirectional optical waveguide.

4. The method of claim 1 wherein detecting the amplitude-modulated digital signal component includes converting the amplitude-modulated digital signal component to a corresponding electrical signal.

5. The method of claim 4 wherein detecting the amplitude-modulated digital signal component includes detecting the corresponding electrical signal in a phase-sensitive way by means of a lock-in amplifier.

6. The method of claim 1 wherein optically modulating the amplitude of the first digital optical signal includes modulating the amplitude of the first digital optical signal at a modulation frequency outside of the frequency spectrum of the first digital optical signal.

7. The method of claim 1 wherein the transmission line includes no branch to an additional end point.

8. An apparatus for monitoring an optical transmission line in which digital optical signals are transmitted bidirectionally between a first end point of the transmission line and a second end point of the transmission line, the apparatus including:
   (a) an optical amplitude modulation unit to which is fed a first digital optical signal for transmission to the second end point through the transmission line, the optical amplitude modulation unit modulating the amplitude of the first digital optical signal with a desired modulation amplitude and a desired modulation frequency to produce an amplitude-modulated digital optical signal which includes both the amplitude modulation provided by the optical amplitude modulation unit and digital information of the first digital optical signal; and
   (b) a detector unit for detecting, in a phase-sensitive way, an amplitude-modulated signal component propagating along the transmission line in the direction from the second end point to the first end point or a signal derived from the amplitude-modulated signal component, for comparing the detected signal with a desired value, and for generating an error signal when the comparison identifies an impermissibly high deviation between the detected signal and the desired value.

9. The apparatus of claim 8 wherein the optical amplitude modulation unit comprises a variable optical attenuator, which is controlled with an electrical modulation signal.

10. The apparatus of claim 8 further including a decoupling unit at the first end point for decoupling a fraction of the amplitude-modulated signal component, and an optoelectrical converter for optoelectrically converting the fraction of the amplitude-modulated signal component and communicating the converted signal to the detector unit.

11. The apparatus of claim 8 further including a passive optical return unit connected at the second end point, the passive optical return unit for passively directing a fraction of the power of the amplitude-modulated digital optical signal along the transmission line in the direction from the second end point to the first end point as the amplitude-modulated signal component.

12. The apparatus of claim 8 wherein the desired modulation frequency is a frequency outside of the frequency spectrum of the digital optical signals transmitted bidirectionally between the first end point of the transmission line and the second end point of the transmission line.

13. The apparatus of claim 8 wherein the transmission line includes no branch to an additional end point.

* * * * *